(12) United States Patent
Chaudhari et al.

(10) Patent No.: US 7,516,071 B2
(45) Date of Patent: Apr. 7, 2009

(54) METHOD OF MODELING SINGLE-ENROLLMENT CLASSES IN VERIFICATION AND IDENTIFICATION TASKS

(75) Inventors: Upendra V. Chaudhari, Briarcliff Manor, NY (US); Stephane H. Maes, Fremont, CA (US); Jiri Navratil, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 845 days.

(21) Appl. No.: 10/611,336

(22) Filed: Jun. 30, 2003

(65) Prior Publication Data

US 2005/0021335 A1 Jan. 27, 2005

(51) Int. Cl.
*G10L 15/06* (2006.01)
*G10L 15/08* (2006.01)
*G10L 15/10* (2006.01)

(52) U.S. Cl. .................. 704/244; 704/243; 704/246; 704/251

(58) Field of Classification Search ................ 704/233, 704/243–246, 256, 250
See application file for complete search history.

(56) References Cited

U.S. PATENT DOCUMENTS

| | | | | |
|---|---|---|---|---|
| 5,787,230 A | * | 7/1998 | Lee | 704/235 |
| 5,793,891 A | * | 8/1998 | Takahashi et al. | 382/228 |
| 5,960,397 A | * | 9/1999 | Rahim | 704/244 |
| 6,389,393 B1 | * | 5/2002 | Gong | 704/244 |
| 6,418,411 B1 | * | 7/2002 | Gong | 704/256.5 |
| 6,539,352 B1 | * | 3/2003 | Sharma et al. | 704/250 |
| 6,618,702 B1 | * | 9/2003 | Kohler et al. | 704/250 |
| 6,751,590 B1 | * | 6/2004 | Chaudhari et al. | 704/246 |
| 7,379,868 B2 | * | 5/2008 | Reynolds | 704/243 |
| 2004/0015358 A1 | * | 1/2004 | Reynolds | 704/256 |

OTHER PUBLICATIONS

"The IBM system for the NIST 2002 cellular speaker verification evaluation", International Conference on Acoustics, Speech, and Signal Processing, Hong Kong, Apr. 2003, by G. N. Ramaswamy et al.
"Speaker Identification and Verification Using Gaussian Mixture Speaker Models", Speech Communication, vol. 17, Issues 1-2, Aug. 1995, pp. 91-108.
R. O. Duda and P. E. Hart, "Pattern Classification and Scene Analysis", Wiley, New York, 1972.
HTIMIT and LLHDB: Speech Corpora for the Study of Handset Transducer Effects, Douglas A. Reynolds, Lincoln Laboratory, MIT, Copyright 1997 IEEE.

* cited by examiner

*Primary Examiner*—James S Wozniak
(74) *Attorney, Agent, or Firm*—Ference & Associates LLC

(57) ABSTRACT

In automatic pattern recognition, in the context of patterns being observed either in the same or a new environment, e.g. a new acoustic channel, as compared to the one seen during the previous enrollment, an improvement wherein degradation of the system recognition accuracy caused by environment/channel mismatches is averted.

17 Claims, 2 Drawing Sheets

METHOD OF MODELING SINGLE-ENROLLMENT CLASSES IN VERIFICATION AND IDENTIFICATION TASKS

FIELD OF THE INVENTION

The present invention relates to problems in automatic pattern recognition systems (for example speaker or speech recognition systems), arising with patterns (that are to be classified as one of the previously seen [enrolled] classes) being observed either in the same or a new environment, e.g., a new acoustic channel, as compared to the one seen during the previous enrollment.

BACKGROUND OF THE INVENTION

An example of the latter situation, as set forth above, is a voiceprint recognition task for a speaker (class) previously enrolled using speech samples collected over a microphone of a type A but later being tested on samples recorded over a microphone type B. It has been widely recognized that environment/channel mismatches cause more or less great a degradation of the system recognition accuracy and represent one of the major challenges in the pattern recognition area. This is covered in at least the following references: "HTIMIT and LLHDB: Speech Corpora for the Study of Handset Transducer Effects", International Conference on Acoustics, Speech, and Signal Processing, Munich, Germany, May 1997, by D. A. Raynolds (microphone mismatch in speech recognition); and "The IBM system for the NIST 2002 cellular speaker verification evaluation", International Conference on Acoustics, Speech, and Signal Processing, Hong Kong, April 2003, by G. N. Ramaswamy et al. (state of the art technology, including mismatched conditions). A need has thus been recognized in connection with solving such problems, among others.

SUMMARY OF THE INVENTION

In accordance with at least one presently preferred embodiment of the present invention, there is broadly contemplated herein a method which helps to do the following:

reduce the negative impact of the mismatched environment mentioned above and makes recognition systems more robust in real-world scenaria where the environment conditions change very often;

eliminate the need for additional data from every particular new environment (i.e., adaptation data) for every particular enrolled model, but rather achieve such adaptation using data independent from the enrolled model population (keeping in mind that in many practical systems a single enrollment of a target model, as opposed to enrollment in multiple environments, is the only choice);

improve the performance in matched conditions (i.e., same environment); and hide data, allowing for class enrollments without storing the actual feature measurements, thus being useful as an implicit data hiding/model encryption method.

In summary, the present invention provides, in one aspect, an apparatus for performing pattern recognition, the apparatus comprising: an input arrangement which inputs features; a base model provision arrangement which provides at least one base model; an environment detector which ascertains an environment from which the at least one base model originated; and a transform arrangement which produces a target model based on a feature vector corresponding to the environment from which the at least one base model originated.

In another aspect, the present invention provides a method of performing pattern recognition, the method comprising the steps of: inputting features; providing at least one base model; ascertaining an environment from which the at least one base model originated; and producing a target model based on a feature vector corresponding to the environment from which the at least one base model originated.

Furthermore, in an additional aspect, the present invention provides a program storage device readable by machine, tangibly embodying a program of instructions executable by the machine to perform method steps for performing pattern recognition, the method comprising the steps of: inputting features; providing at least one base model; ascertaining an environment from which the at least one base model originated; and producing a target model based on a feature vector corresponding to the environment from which the at least one base model originated.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
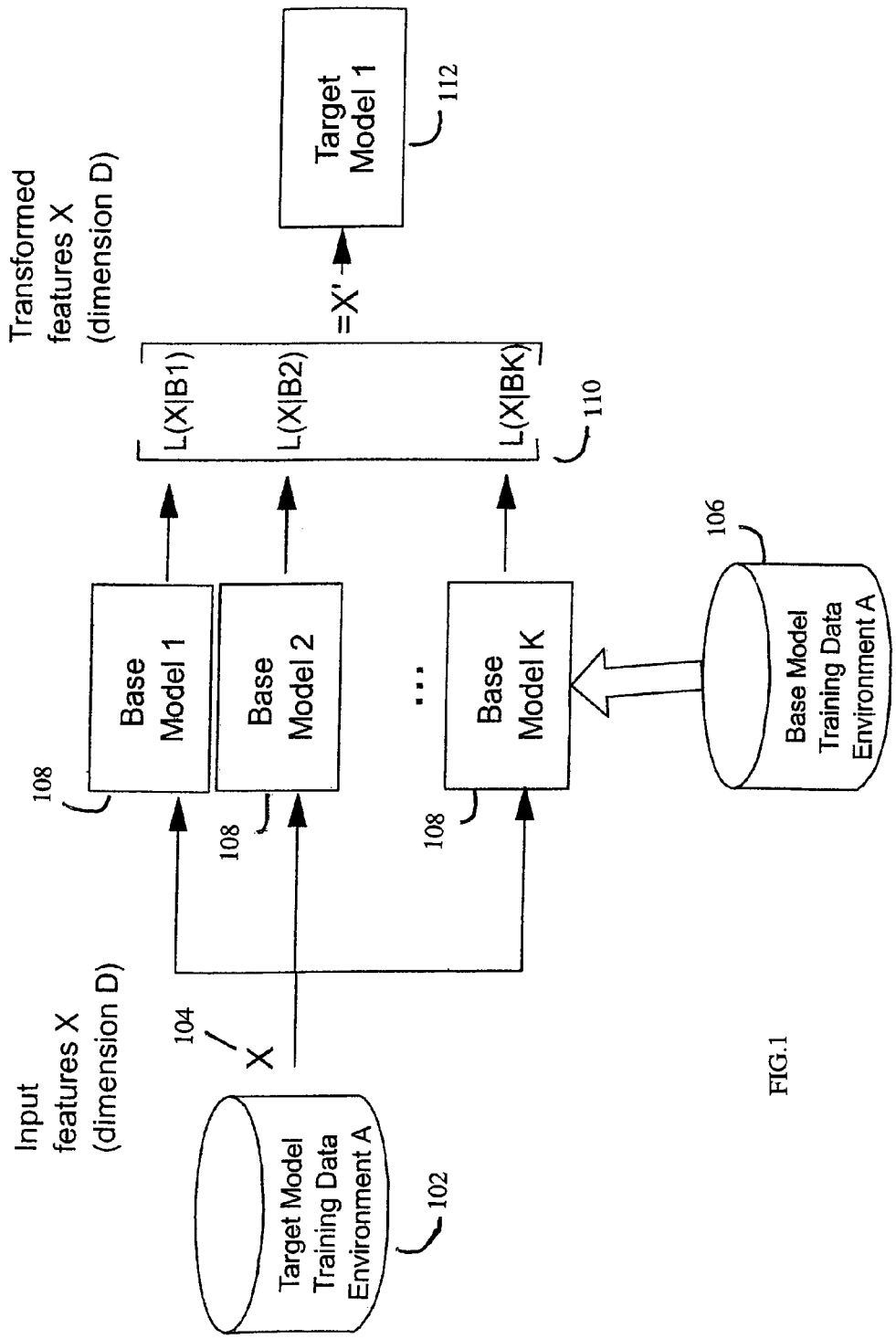
FIG. 1 schematically illustrates a training base and target models.

An underlying concept utilized for channel mismatch compensation, in accordance with at least one preferred embodiment of the present invention, is the cascading of two model levels. In this scenario, a set of M generative base (or background) models (e.g., background speakers) is created. These models may be of any type, for example Gaussian Mixture Models (see "Finite Mixture Models", by Geoffrey McLachlan and David Peel, ISBN: 0-471-00626-2, 2000); however, by definition, they must provide a measure of sample generation "likeliness", wherein statistical models will provide likelihood which is directly connected to the notion of probability density, while non-statistical models will provide another type of scores to express the measure of closeness. The base models can be viewed as complex, generally non-linear trainable D-to-1 functions of the D-dimensional input feature space. In the second stage, another level of models is preferably built using the M output scores generated by the base models as input. Now, assuming the base models are trained and available for an environment A, using some training data set X (set of feature vectors) of a target class (e.g. a target speaker) from environment A, M scores can be calculated for each such feature vector, thus forming an M-dimensional meta-feature vector. This is formulated as a transform of the set X to X' ($(f_A:R^D \to R^M, X'=f_A(x))$). The transformed X' training set is then used to train a meta-model for the target class, given the environment A.

Next, assume a test comes through a microphone/channel B≠A, and there exists a corresponding set of base models (part of the system) that were trained in condition B. If the information about the channel identity (B) is explicitly available (in many real applications it is, for example in digital telephony the codec and device type can be extracted), then the channel compensation is achieved by carrying out a transform $f_B: R^D \rightarrow R^M, X' = f_B(X)$, i.e., by calculating the base scores on the set of B-channel base models and using their output scores as input to the stacked model for the target class (or classes), previously trained in environment A. The effect of the new transform is that a possible mismatch in feature relationships present in environment A (and learned by the target class in the same) is mitigated by exchanging $f_A$ by $f_B$ and therefore adapting the target feature space to the new environment, which helps restore the originally observed feature relationships and thus reduce the mismatch.

In cases where there is no explicit information about the environment type of the test, a maximum-likelihood method can be utilized at test time on multiple base sets to decide which environment is the most likely to be the one of the test sample. (See "Pattern Classification, Second Edition", by R. O. Duda, P. E. Hart, and D. G. Stork, John Wiley and Sons, 2000).

An important point in the above-discussed adaptation is the independence of the base set and the target model, which allows for a single enrollment of the target class.

The stacked model can be used in combination with a model for the same target class created in the D-dimensional original feature space. The combination may help prevent information loss in cases when M is chosen to be small (particularly M<D), i.e. in case when a dimensionality reduction is achieved by the function $f$. In the combination, the performance of both models is utilized and, depending on the degree of mismatch, the focus may be dynamically shifted, from/to the base target model to/from the stacked model. In a heavily mismatched environment, the base target model will show poor accuracy and hence the stacked and compensated model will be emphasized, and vice versa. An example of such a dynamic combination is a linear interpolation of the base target model score ($S_{T0}$) and the stacked target model score ($S_{T1}$):

$$S = w_0(c) S_{T0} + w_1(c) S_{T1} \quad (1.1)$$

with w denoting the weight factors that are a function of the channel/environment c.

The principal steps discussed above may preferably be exercised on an example of a speaker verification system including Gaussian Mixture Models (GMM) representing the two classes: 1) the target speaker, and 2) the "world" (or background) model. As stated above however, the method is nonetheless applicable to essentially any classification problem involving two or more classes, represented by either by GMMs or by means of other model structures.

The verification task is posed as a binary hypothesis problem involving two classes as mentioned above. Let $M_T$ and $M_W$ denote the target and the world GMM model respectively, and let L(X|M) be the likelihood measure for an acoustic utterance X to be generated by a model M. In the present (illustrative and non-restrictive) example, L shall be the generative log-probability density of the model.

To arrive at a verification decision, i.e. to either accept or reject the utterance X as being spoken by the target speaker or not, typically the likelihood ratio between the target and the world model is calculated as follows:

$$\Lambda(X) = L(X|M_T) - L(X|M_W) \quad (2.1)$$

(see "Speaker Identification and Verification Using Gaussian Mixture Speaker Models," 17 Speech Communication 91-108 (1995) by D. A. Reynolds) which then serves as basis for the threshold operation:

$$\text{accept when } \Lambda(X) \geq \theta, \text{ otherwise reject} \quad (2.2)$$

with θ being the decision threshold that controls the system bias towards more acceptances or more rejections.

Furthermore, the likelihood of the world model can be composed from many individual GMMs; in particular, it can be effectively approximated by a small number of models whose speakers are similar to the target speaker (so-called cohort speakers, or cohorts). Thus, an average likelihood replaces that of the world model in the likelihood ratio (2.1):

$$\Lambda(X) = L(X|M_T) - \frac{1}{N}\sum_{i=1}^{N} L(X|M_{C_i}) \quad (2.3)$$

Assume a set of K base GMMs, denoted $B_{A1}, \ldots, B_{AK}$, are used as the base models to realize the transform function $f$ described above, trained in the environment A. Also, such sets exist for environments B, C, . . . , etc. Then the models $M_T$ and $M_{C_i}$, i=1, . . . , N are created using corresponding training sets of feature vectors in environment A:

$$X' = \{L(X|B_{A1}), \ldots, L(X|B_{AK})\}.$$

In a test occurring in the environment B the feature vectors are obtained as:

$$X' = \{L(X|B_{B1}), \ldots, L(X|B_{BK})\},$$

etc.

By way of summary, the following steps maybe undertaking to build a system and to carry out the compensation described hereinabove:

1. Build a pool of base models of the system (GMM) using standard techniques, e.g., as described in "Pattern Classification, Second Edition", by R. O. Duda, P. E. Hart, and D. G. Stork, John Wiley and Sons, 2000.

2. Define a discriminant function L(X|B), which expresses the closeness of a sample X to a given base model B.

3. Using an appropriate algorithm, select a set of K GMM base models $S = \{B_1, \ldots, B_K\}$ from the global pool of models (Step 1). An example of such an algorithm is selecting the K closest models $M_{C_1}, \ldots, M_{C_N}$ given a target mode.

4. Define a K-dimensional space in $R^K$ such that its bases are constituted by functions of the likelihoods on the selected model set, i.e. the function $f$ mentioned above, for each known environment A, B, . . . , etc.

5. Transform the training data of the target model $M_T$ using $f$ for the matching environment (A), i.e. using $f_A$.

6. Create a GMM using the transformed training set.

7. Repeat steps 5,6 for all cohort models $M_{C_1}, \ldots, M_{C_N}$, using cohort training data.

8. For a new test in environment B, transform the test feature vectors using $f_B$ and calculate the likelihood using the GMM (target and cohorts) created in Step 6. and calculate the likelihood ratio as in Eq. (2.3).

9. (Optional) Combine the likelihood from Step 8 with a likelihood of a standard verification system using the original, uncompensated feature space, for example as in (1.1).

Figure 2:
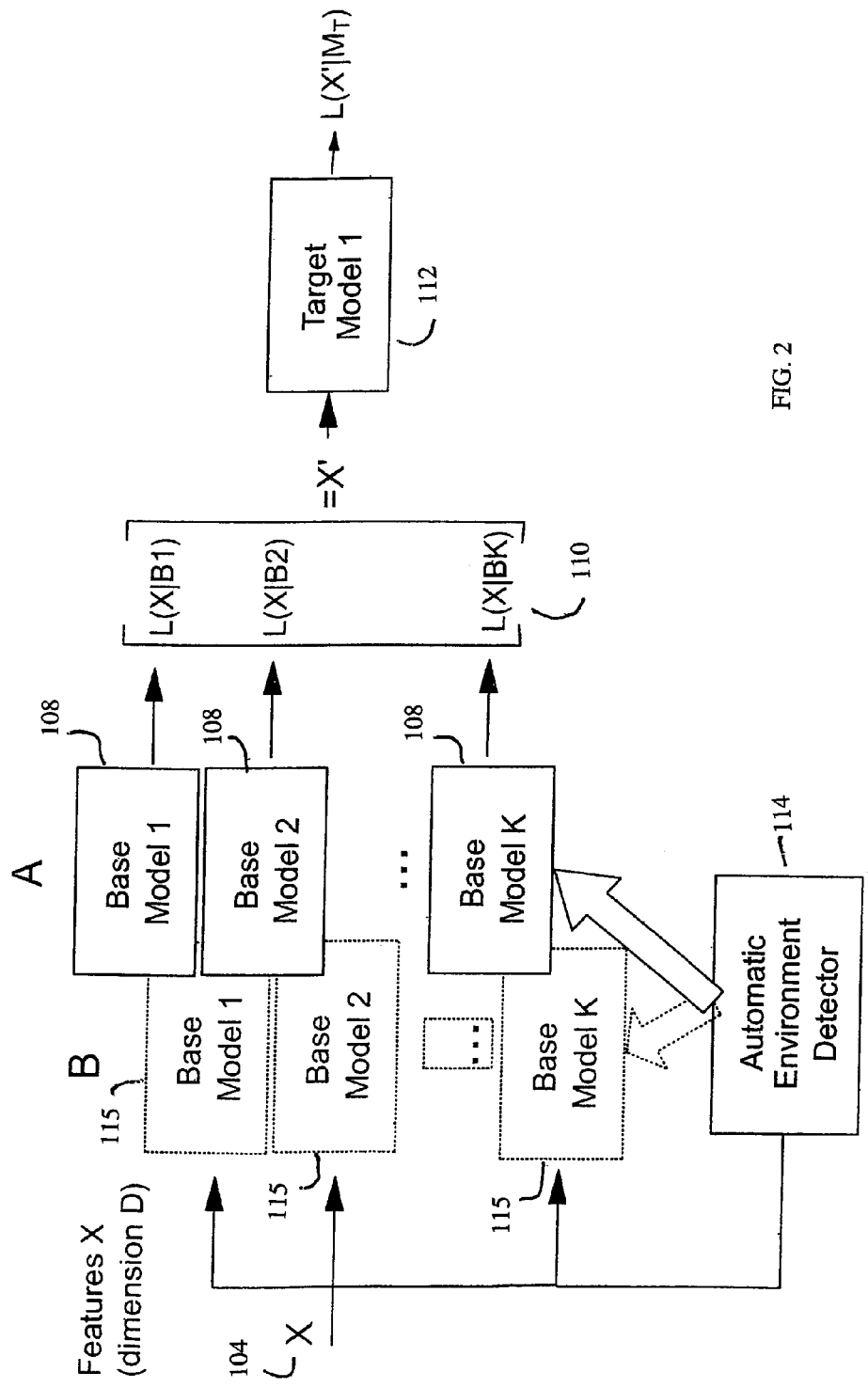
FIG. 2 schematically illustrates environment compensation in testing.

A system overview, schematically illustrated in FIG. 1 (depicting training) and FIG. 2 (depicting testing), provides an additional convenient summary of the foregoing discussion. As shown in FIG. 1, target model training data in environment A (102) provides input features X (104) which, when combined with the base model training data of environment A (106), yields base models 1, 2 . . . K (108). The target model (112) is then created using transformed features X' (110).

FIG. 2 illustrates environment compensation during testing. As shown, upon the provision of input features X (104), automatic environment detector 114 will, depending on whether environment A, B or another environment is detected, inform resolution of the feature vector 110 used in creating the target model 112.

It is to be understood that the present invention, in accordance with at least one presently preferred embodiment, includes an input arrangement which inputs features, a base model provision arrangement which provides at least one base model, an environment detector which ascertains an environment from which the at least one base model originated, and a transform arrangement which produces a target model based on a feature vector corresponding to the environment from which the at least one base model originated. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A pattern recognition apparatus, said apparatus comprising:
    an input arrangement which inputs patterned features;
    a base model arrangement which provides at least one base model;
    an environment detector which ascertains an environment from which the at least one base model originated; and
    a transform arrangement which produces a stacked target model based on a feature vector corresponding to the environment A from which the at least one base model originated using:

$((f_A : R^D \to R^M, X' = f_A(x))$, wherein

A is the channel environment for training data set from which the base model originated;
    X is a training data set of feature vectors of a target class;
    X' is a transformed stacked target model training set;
    $R^D$ is an input pattern feature space from the input arrangement;
    $R^M$ is a feature space calculated by base scores on the A-channel base models;
    $f_A$ is the stacked target model based on the feature vector corresponding to the environment A; and
    there is independence between the at least one base model and the stacked target model allowing for a single enrollment of a target class;
    a second transform arrangement which produces a channel compensation stacked target model based on a feature vector corresponding to environment B using:

$((f_b : R^D \to R^M, X' = f_B(x))$, wherein

B is the new channel environment;
    $R^D$ is the input pattern feature space from the input arrangement;
    $R^M$ is a feature space calculated by base scores on the set of B-channel base models; and
    $f_B$ is the channel compensation stacked target model based on the feature vector corresponding to the new environment B;
    a verification arrangement which compares the second transform with the first transform to arrive at a determination of mismatch in feature relationships present in environment A, wherein focus is preferably shifted from $f_B$ to or from $f_A$ depending on a degree of mismatch between the at least model from environment A and the model from environment B; and
    an arrangement which produces a pattern recognition decision based on the model verification result.

2. The apparatus according to claim 1, wherein said apparatus is adapted to perform speech recognition and said input arrangement is adapted to input speech features.

3. The apparatus according to claim 1, wherein said base model arrangement is adapted to build a pool of base models.

4. The apparatus according to claim 3, wherein said base models are Gaussian Mixture Models.

5. The apparatus according to claim 3, wherein said environment detector is adapted to express the closeness of a set of at least one input feature to a given base model.

6. The apparatus according to claim 1, wherein said feature vector represents at least one likelihood associated with at least one input feature in a given environment.

7. The apparatus according to claim 1, wherein said environment detector is adapted to inform the production of said feature vector in correspondence with the environment from which the at least one base model originated.

8. A computer implemented method of performing pattern recognition, said method comprising the steps of:
    inputting patterned features;
    providing at least one base model;
    ascertaining an environment from which the at least one base model originated; and
    producing a stacked target model based on a feature vector corresponding to the environment A from which the at least one base model originated using:

$((f_A : R^D \to R^M, X' = f_A(x))$, wherein

A is the channel environment for training data set from which the base model originated;
    X is a training data set of feature vectors of a target class;
    X' is a transformed stacked target model training set;
    $R^D$ is an input pattern feature space from the input arrangement;
    $R^M$ is a feature space calculated by base scores on the A-channel base models,
    $f_A$ is the stacked target model based on the feature vector corresponding to the environment A, and
    there is independence between the at least one base model and the stacked target model allowing for a single enrollment of a target class;
    a second transform arrangement which produces a channel compensation stacked target model based on a feature vector corresponding to a new environment B using:

$((f_b : R^D \to R^M, X' = f_B(x))$, wherein

B is the new channel environment;
    $R^D$ is an input pattern feature space from the input arrangement;
    $R^M$ is a feature space calculated by base scores on the set of B-channel base models; and $f_B$ is the channel compensation stacked target model based on the feature vector corresponding to the new environment B;

verifying the stacked target model by comparing the second transform with the first transform to arrive at a determination of mismatch in feature relationships present in environment A, wherein focus is preferably shifted from $f_B$ to or from $f_A$ depending on a degree of mismatch between the at least model from environment A and the model from environment B; and producing a pattern recognition decision based on the model verification result.

9. The method according to claim 8, wherein said method is adapted to perform speech recognition and said inputting step comprises inputting speech features.

10. The method according to claim 8, wherein said providing step comprises building a pool of base models.

11. The method according to claim 10, wherein said base models are Gaussian Mixture Models.

12. The method according to claim 10, wherein said ascertaining step comprises expressing the closeness of a set of at least one input feature to a given base model.

13. The method according to claim 8, wherein said feature vector represents at least one likelihood associated with at least one input feature in a given environment.

14. The method according to claim 13, wherein said ascertaining step comprises informing the production of said feature vector in correspondence with the environment from which the at least one base model originated.

15. A computer program storage device readable by a computer, tangibly embodying a program of coded computer instructions executable by the computer to perform method steps upon computerized data for performing pattern recognition, said method comprising the steps of:

inputting data corresponding to patterned features;
providing at least one base model;
ascertaining an environment from which the at least one base model originated; and
producing a stacked target model based on a feature vector corresponding to the environment A from which the at least one base model originated using:

$$((f_A : R^D \to R^M, X' = f_B(x)), \text{ wherein}$$

A is the channel environment for training data set from which the base model originated;

X is a training data set of feature vectors of a target class;

X' is a transformed stacked target model training set;

$R^D$ is an input pattern feature space from the input arrangement;

$R^M$ is a feature space calculated by base scores on the A-channel base models;

$f_A$ is the stacked target model based on the feature vector corresponding to the environment A; and there is independence between the at least one base model and the stacked target model allowing for a single enrollment of a target class;

a second transform arrangement which produces a channel compensation stacked target model based on a feature vector corresponding to environment B using:

$$((f_b : R^D \to R^M, X' = f_B(x)), \text{ wherein}$$

B is the new channel environment;

$R^D$ is the input pattern feature space from the input arrangement;

$R^M$ is a feature space calculated by base scores on the set of B-channel base models; and $f_B$ is the channel compensation stacked target model based on the feature vector corresponding to the new environment B;

verifying the stacked target model by comparing the second transform with the first transform to arrive at a determination of mismatch in feature relationships present in environment A, wherein focus is preferably shifted from $f_B$ to or from $f_A$ depending on a degree of mismatch between the at least model from environment A and the model from environment B; and producing a pattern recognition decision based on the model verification result.

16. The apparatus according to claim 1, wherein cascading of two model levels is utilized for channel mismatch compensation.

17. The method according to claim 8, wherein cascading of two model levels is utilized for channel mismatch compensation.

* * * * *